United States Patent
Bright

(10) Patent No.: US 10,669,777 B2
(45) Date of Patent: Jun. 2, 2020

(54) MATERIALS HANDLING SYSTEM

(71) Applicant: Bright Structures Ltd, Exeter (GB)

(72) Inventor: Stephen Bright, Exeter (GB)

(73) Assignee: Bright Structures Ltd., Exeter (GB)

( * ) Notice: Subject to any disclaimer, the term of this patent is extended or adjusted under 35 U.S.C. 154(b) by 29 days.

(21) Appl. No.: 15/726,181

(22) Filed: Oct. 5, 2017

(65) Prior Publication Data

US 2018/0100351 A1  Apr. 12, 2018

(51) Int. Cl.
| | |
|---|---|
| *E06C 7/10* | (2006.01) |
| *E06C 7/08* | (2006.01) |
| *E06C 1/10* | (2006.01) |
| *E06C 1/18* | (2006.01) |
| *E06C 7/12* | (2006.01) |
| *E06C 7/50* | (2006.01) |
| *E06C 1/16* | (2006.01) |
| *E06C 1/22* | (2006.01) |
| *B62B 5/00* | (2006.01) |
| *E06C 1/397* | (2006.01) |

(52) U.S. Cl.
CPC .............. *E06C 7/083* (2013.01); *E06C 1/10* (2013.01); *E06C 1/16* (2013.01); *E06C 1/18* (2013.01); *E06C 1/22* (2013.01); *E06C 7/10* (2013.01); *E06C 7/12* (2013.01); *E06C 7/50* (2013.01); *B62B 5/0089* (2013.01); *E06C 1/397* (2013.01)

(58) Field of Classification Search
CPC .................................... E06C 7/10; E06C 7/12
USPC ....................................................... 182/103
See application file for complete search history.

(56) References Cited

U.S. PATENT DOCUMENTS

| | | | |
|---|---|---|---|
| 665,780 A | 1/1901 | Hayvvard | |
| 731,708 A * | 6/1903 | Quinn | |
| 976,074 A * | 11/1910 | Hartman | |
| 976,240 A * | 11/1910 | Winkler | |
| 3,731,947 A | 5/1973 | Fontaine | |
| 4,491,196 A | 1/1985 | Bocker | |
| 7,424,932 B1 * | 9/2008 | Murphy | E06C 1/345 182/103 |
| 7,900,745 B1 * | 3/2011 | Tindal | E06C 7/16 182/103 |

(Continued)

FOREIGN PATENT DOCUMENTS

| | | | |
|---|---|---|---|
| CN | 1364711 A | 8/2002 | |
| CN | 103510841 A * | 1/2014 | |
| FR | 1204789 A * | 1/1960 | ............... E06C 7/10 |

(Continued)

OTHER PUBLICATIONS

Patents Act 1977: Search Report Under Section 17(5), UK Patent Application Serial No. GB1617099.5, dated Mar. 23, 2017

(Continued)

*Primary Examiner* — Alvin C Chin-Shue
(74) *Attorney, Agent, or Firm* — Reichel Stohry Dean LLP; Mark C. Reichel; Natalie J. Dean

(57) ABSTRACT

A materials handling system (10) comprising a first (60) and second ladder (70) section connectable together to form a longer ladder, a tensioning system (100) attached to each section for tensioning the connected ladder sections, and a trolley (110) arranged to travel along the connected ladder sections, wherein the system includes a cable (158) and pulley for moving the trolley along the connected ladder sections.

19 Claims, 12 Drawing Sheets

(56) References Cited

U.S. PATENT DOCUMENTS 8,695,761 B1    4/2014  Berkbuegler

FOREIGN PATENT DOCUMENTS

| FR | 2390371 | | 12/1978 | | |
|----|---------|---|---------|---|---|
| FR | 2466603 | | 4/1981 | | |
| FR | 2748059 | A1 * | 10/1997 | ............... | E06C 1/10 |
| GB | 2530710 | A | 4/2016 | | |
| WO | WO 2005/099452 | A2 | 10/2005 | | |

OTHER PUBLICATIONS

Patents Act 1977: Combined Search and Examination Report Under Sections 17 and 18(3), Great Britain Patent Application No. GB1715196.0, dated Mar. 1, 2018.

* cited by examiner

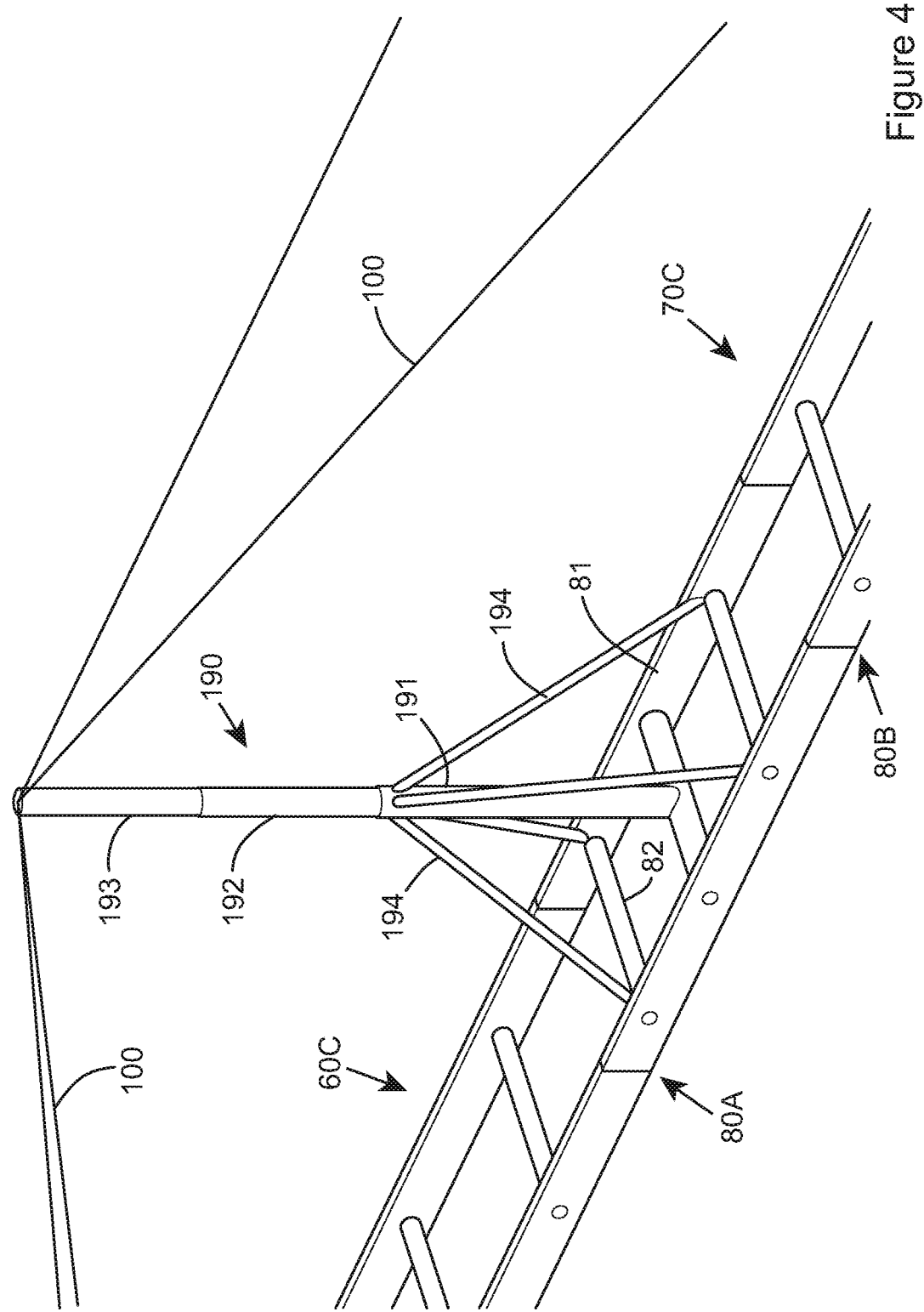

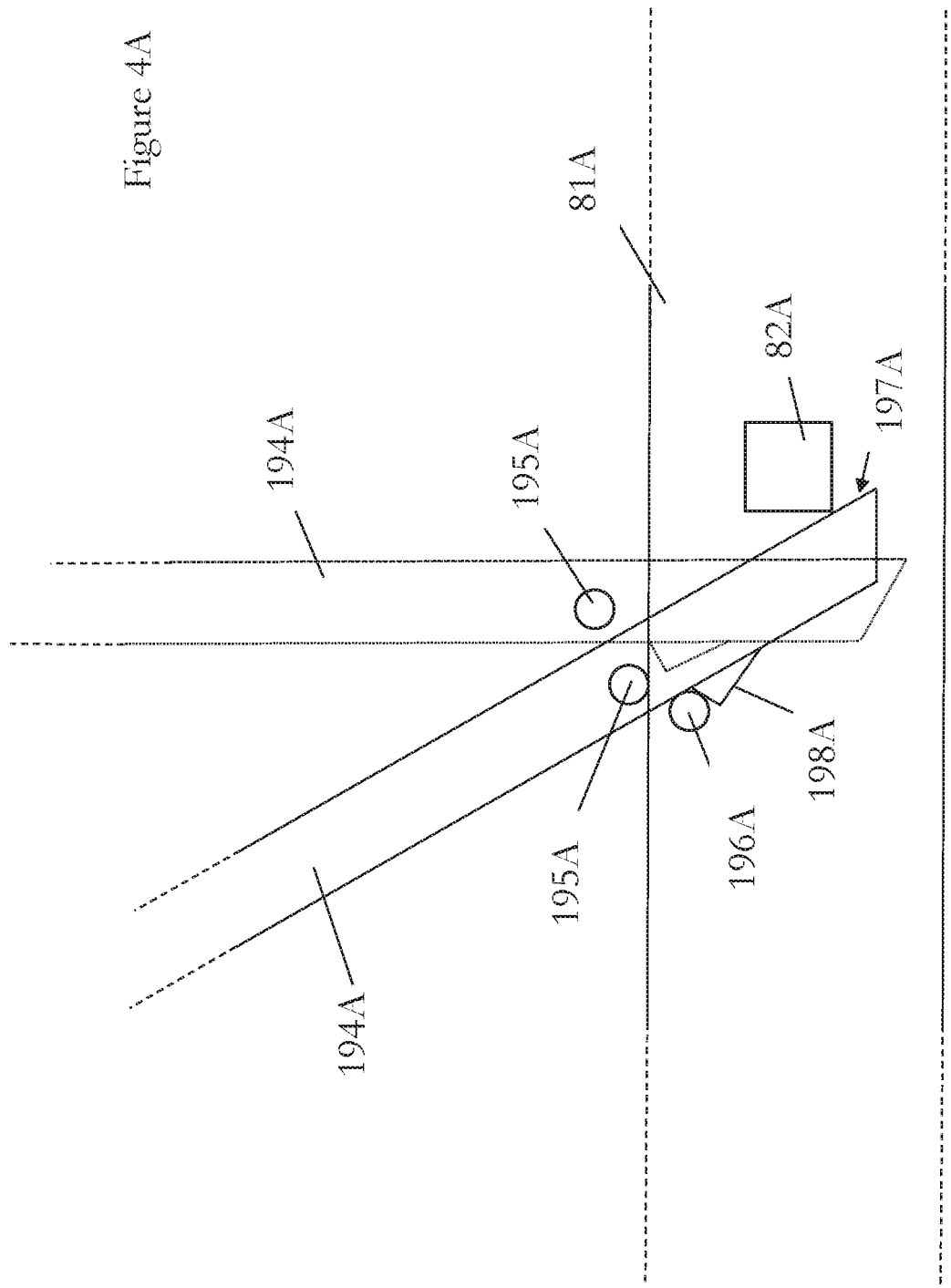

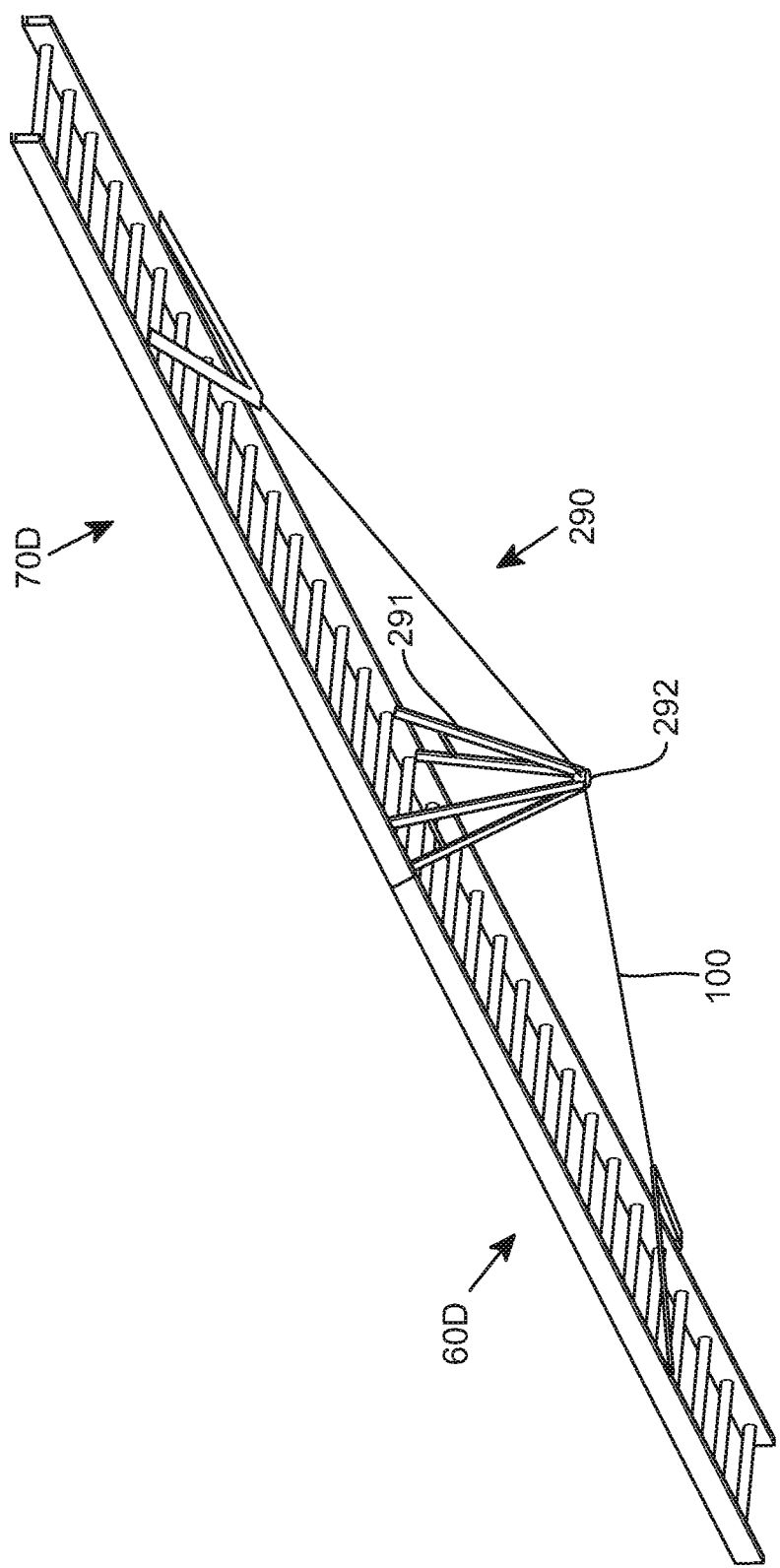

MATERIALS HANDLING SYSTEM

PRIORITY

The present application is related to, and claims the priority benefit of, Great Britain Patent Application Serial No. GB1617099.5, filed Oct. 7, 2016, the contents of which are incorporated herein directly and by reference in their entirety.

FIELD OF THE INVENTION

The present invention relates generally to a materials handling system and finds particular, although not exclusive, utility in raising materials to the roof of a building during construction work.

BACKGROUND

In this description, the term 'materials' may include personnel as well as cargo.

Materials handling systems which comprise ladders and trolleys are known. These comprise single length ladders, or ladders which extend by one sliding over another creating a step at the junctions. The former have limited length and the latter are not relatively strong reducing the weight of materials which may be moved along them. It is desirable to have a system which can provide longer lengths without loss of strength.

BRIEF SUMMARY

In a first aspect, the invention provides a materials handling system comprising a first and second ladder section connectable together to form a longer ladder, a tensioning system attached to each section for tensioning the connected ladder sections, and a trolley arranged to travel along the connected ladder sections, wherein the system includes a cable and pulley for moving the trolley along the connected ladder sections, and wherein the trolley comprises an automatic brake for preventing the trolley from travelling in one direction relative to the longer ladder's linear length.

In this respect the term "cable" may also include a strap, rope, wire, cord, chain, and other relatively flexible, but inextensible, members.

The pulley may be geared. There may be more than one pulley. A pulley may be located at an end of the connected ladder sections, or at other points along its length. An intermediate pulley may be located on the trolley. The cable may be hand operated or connected to, or powered by, a winch. A motor may be used to wind the cable over a drum to move the trolley. The motor may be electrical. The motor may be unitary with the drum or may be separate. For instance, an electric screwdriver or drill may be used to rotate the drum. The winch may include a brake. The brake may include a ratchet and pawl to allow rotation in only one direction. The winch brake may be manually engaged and disengaged.

The ladder sections may include two stiles separated from each other by rungs. The rungs may project beyond the outside surface of each stile, or may terminate at the inside or outside surface of each stile.

At least one surface on one stile of each first and second ladder section may be contiguous with one another. In this way a continuous surface may be provided for the trolley to run along. The longer ladder may comprise two first ladder sections and two second ladder sections, arranged with the two first sections being parallel and adjacent one another and the two second sections being parallel and adjacent one another. In such an arrangement the trolley wheels may be configured to run along the outermost stiles of the parallel ladders. The additional ladder sections placed alongside the first and second ladders may or may not be interconnected to the first and second ladder sections.

The trolley may include wheels for running along the stiles of the ladders. The trolley may include a set of wheels running along the sides of the ladder stiles to maintain the trolley's alignment along the ladders. Alternatively, the wheels may include flanges on one or both edges thereof (similar to railway carriage wheels) to maintain alignment along the stiles. The ladder stiles may also be profiled to retrain the running wheels above, and on, their sections, using upstand guideway projections, for instance.

The ladder sections may be connectable together by means of a male projection arranged at the end of one of the two sections and a corresponding female socket arranged at the end of the other of the two sections.

The tensioning system may comprise a clamp arranged across the junction of the two ladder sections. The clamp may be arranged to impart a compressional force onto the ends of the two ladder sections which meet. In this regard, the ladder ends may be considered to be squeezed, or post-tensioned, together. The clamp may comprise a ratchet strap, or similar, adjustable tensioner fed through ladder rungs on either side of the joint.

The tensioning system may comprise a mast extending away from the longer ladder and a cable attachable to the mast and/or either or both ladder sections, wherein the mast is arranged to hold the cable away from the longer ladder. More than one cable may be used. In this respect the term "cable" may also include a strap, rope, chain, and other relatively flexible, but inextensible, members, or a rod, tube or bar, and other relatively rigid, but inextensible, members.

The mast may comprise attachment means for being releasably attached to at least one of the two ladder sections.

The attachment means may comprise a "U" or "L" shape member for slotting at least partially around a rung, stile or linear member of either, or both, ladder sections, or an insert projecting into holes in the sides of the stiles.

An intermediate ladder section may be releasably connectable between the first and second ladder sections. The mast may be attached to, or integral with, this intermediate section. The intermediate ladder section may releasably connect with each of the first and second ladder sections in a similar manner as how the first and second ladder sections may releasably interconnect.

The mast may be an "A" or "U" shape frame releasably attachable to the longer ladder section. For instance, it may be releasably attachable to both stiles of at least one of the ladder sections. Alternatively, two "A" frames may be provided, one each side of the ladder section or longer ladder. A cross-member may be arranged connecting the upper ends of each "A" frame.

The term "A frame" may encompass an inverted "V" frame.

The attachment means may comprise two pairs of braces, each pair arranged to be releasably attached to the longer ladder, and arranged to be releasably affixed to one another at their ends distal from the ladder.

The mast may be a single member. The mast may be positioned symmetrically or asymmetrically relative to the ladder sections. For instance, it might be a single mast attached to only one side (or stile) of the ladder. The longitudinal axis of the mast may lie non-perpendicular to the longitudinal length of the ladder in more than one of the three cardinal planes.

The length of the mast may be adjustable. For instance, the mast may be telescopic. Other ways to adjust the length of the mast are contemplated such as having more than one connectable section.

The angle between the longitudinal length of the mast and the longitudinal length of the longer ladder may be adjustable.

The tensioning system may comprise means for attaching the cable to both ladder sections centrally between the stiles. For instance, the materials handling system may further comprise a cross member at, or adjacent, at least one end of the longer ladder. The cable may be attached to this cross member. The cross member may be another cable attached to both stiles.

The trolley may comprise a deck for carrying materials, wherein the position of the deck relative to the linear length of the longer ladder is adjustable to maintain it horizontal when the longer ladder is other than perpendicular or horizontal. For instance, the angle between the planar surface of the deck, on which materials may be carried, and the longitudinal length of the ladder may be adjustable. This may be effected by one side of the deck being pivoted to the trolley.

The materials handling system of any preceding claim, wherein the brake includes a movable member which in a first position rides over, or is lifted clear of, the rungs of the ladder sections with the trolley moving in one direction, and in a second position engages with a rung with the trolley moving in the opposite direction.

The materials handling system may further comprise a third ladder section having a longitudinal axis non-parallel to the longitudinal axis of the first and second ladder sections. The third ladder section may be integral with one of the first and second ladder sections. Alternatively, it may be a separate ladder section attached to one end of the either the first or second ladder sections. The third ladder section may be used to tip the trolley such that it unloads its materials automatically. The third ladder section may be curved in a vertical plane lying parallel to the longitudinal length of the ladder sections.

The materials handling system may further comprise a launch device comprising a support for supporting the longer ladder, the support including launch means to allow the longer ladder to move relative to it. The longer ladder may be inverted (upside down) during launch to prevent the ladder tensioning system fouling the launch means.

The launch means may include a surface on which the longer ladder may slide. Alternatively, or additionally the launch means may include rollers over which the longer ladder may move. In this way the ladder may be slid along, or moved over, the support with the longitudinal length of the ladder lying non-parallel to the horizontal such that one end will rise up and be positionable against the structure. The roller system may include a separate or integral set of guide wheels or rollers to constrain the long ladder alignment during launch.

A stand may be included in the system for raising the support above the ground. Alternatively, the support may be held above the ground by one or more people. In this regard, the support may include one or more handles for gripping in use. The handles may be the projecting wheel axles with suitable grips.

The support may be pivotable relative to the stand. The launch means may comprise the trolley turned upside down with the wheel uppermost, in use.

In use, the ladder sections may be attached to one another, tensioned and then loaded onto the support. The longer ladder may be arranged with the tensioning system uppermost. If the support is attached to the stand then it may be pivoted upwards at one end. The longer ladder may then be moved (or launched), relative to the stand for positioning against the structure (e.g. a building). Once positioned against a structure the longer ladder may be rotated through 180° (about its longitudinal axis) to orientate the tensioning system (e.g. the clamps and/or cables and masts) lowermost. The longer ladder may then be stiffened for carrying the goods trolley with loading. The trolley may then be used to move materials and/or personnel along the longer ladder.

The materials handling system may further comprise an elastic member arranged at one end of the longer ladder and an engagement member located on the trolley for engagement with the elastic member. In use, as the trolley approaches the end with the elastic member, the engagement member (e.g. a hook) will engage with the elastic member and act to slow the trolley and also urge it back the way it has come. This may be useful where the longer ladder has a curved portion at one end (such as the top) for altering the orientation of the trolley, for instance, to allow the trolley to self-tip. Without the elastic member and engagement member the trolley may be more difficult to move back down the longer ladder.

An uneven surface may be provided at one end of the longer ladder, over which the trolley is arrangeable to travel, so as to shake the trolley and aid its self-tipping. For instance, a serrated surface could be attached to the stiles at one end.

The trolley may include a retaining member which extends from the trolley around the side of the ladder and underneath the ladder such that the trolley cannot move away from the surface of the ladder on which it is travelling beyond a predetermine amount. This predetermined amount may be in the range 2 mm to 50 mm.

In one example, the retaining member may extend under the portions of the rungs which project beyond the outer surfaces of the stiles, if the ladders include such projecting rungs.

BRIEF DESCRIPTION OF THE DRAWINGS

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

FIG. 4 is a perspective view of part of a materials handling system including a mast;

FIG. 4A is a side view of part of a brace being installed onto a ladder section;

FIG. 5 is a perspective view of a materials handling system including a mast;

DETAILED DESCRIPTION

Figure 1:
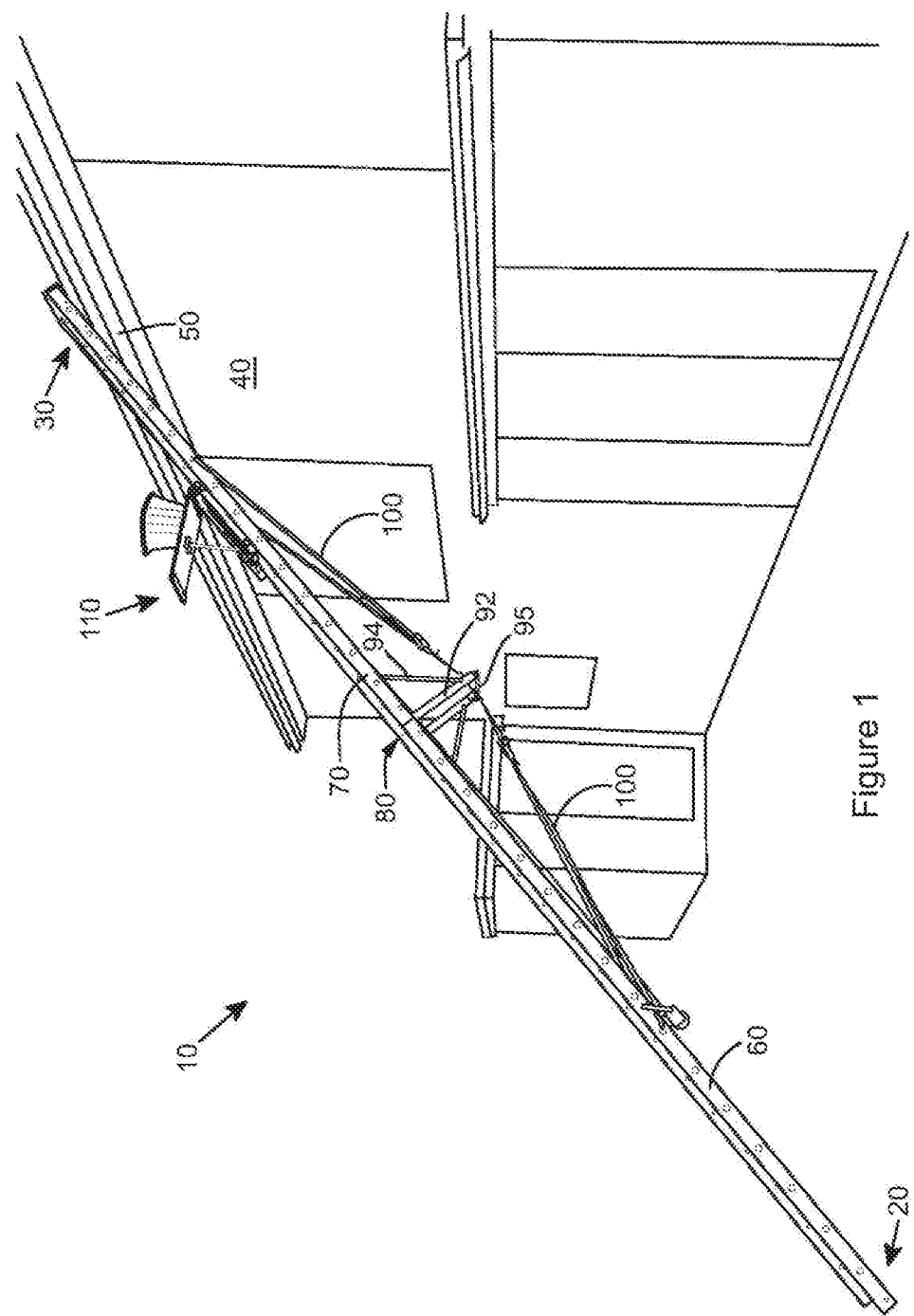
FIG. 1 is a view of a materials handling system in place against a building.

The present invention will be described with respect to certain drawings but the invention is not limited thereto but only by the claims. The drawings described are only schematic and are non-limiting. Each drawing may not include all of the features of the invention and therefore should not necessarily be considered to be an embodiment of the invention. In the drawings, the size of some of the elements may be exaggerated and not drawn to scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that operation is capable in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that operation is capable in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "an embodiment" or "an aspect" means that a particular feature, structure or characteristic described in connection with the embodiment or aspect is included in at least one embodiment or aspect of the present invention. Thus, appearances of the phrases "in one embodiment", "in an embodiment", or "in an aspect" in various places throughout this specification are not necessarily all referring to the same embodiment or aspect, but may refer to different embodiments or aspects. Furthermore, the particular features, structures or characteristics of any embodiment or aspect of the invention may be combined in any suitable manner, as would be apparent to one of ordinary skill in the art from this disclosure, in one or more embodiments or aspects.

Similarly, it should be appreciated that in the description various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Moreover, the description of any individual drawing or aspect should not necessarily be considered to be an embodiment of the invention. Rather, as the following claims reflect, inventive aspects lie in fewer than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some features included in other embodiments, combinations of features of different embodiments are meant to be within the scope of the invention, and form yet further embodiments, as will be understood by those skilled in the art. For example, in the following claims, any of the claimed embodiments can be used in any combination.

In the description provided herein, numerous specific details are set forth. However, it is understood that embodiments of the invention may be practised without these specific details. In other instances, well-known methods, structures and techniques have not been shown in detail in order not to obscure an understanding of this description.

In the discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The use of the term "at least one" may mean only one in certain circumstances.

The principles of the invention will now be described by a detailed description of at least one drawing relating to exemplary features of the invention. It is clear that other arrangements can be configured according to the knowledge of persons skilled in the art without departing from the underlying concept or technical teaching of the invention, the invention being limited only by the terms of the appended claims.

In FIG. 1, the materials handling system is indicated generally as "10". This comprises two ladder sections 60, 70 connected together at a mid-point 80 to form one long ladder. The materials handling system 10 is shown lying at an angle of approximately 40 degrees above the horizontal with its foot 20 resting on the ground and its upper end 30 resting on the eaves 50 of a building.

Each ladder section may have stiles with substantially rectangular cross-sections. Each stile may therefore have a front surface, a rear surface being the one parallel to the front surface and spaced apart by the sides of the stiles, and two side surfaces through which rungs pass. The inside side surfaces are the surfaces facing each other across the length of the rungs. The outside side surfaces are the surfaces facing away from the rungs.

The stiles of the two ladder sections may have the same spacing, measured from inside side surface to inside side surface.

By attaching the two ladder sections together one continuous ladder may be created which has contiguous stile surfaces and with the length of all rungs lying in the same plane. The term contiguous may mean lying in the same plane.

A mast 92 is attached at the mid-point 80 of each stile and braced with arms 94 which are attached at one end to the end of the mast 92 distal from the ladder and at the other end to the stiles. A cross member 95 connects the top of each mast 92. A strap 100 is attached at one end to each stile of each ladder section away from the mid-point 80 and at the other end to the cross member 95. The length of the straps may be adjustable such that they may tightened (tensioned) to thereby act as the tensioning system and increase the stiffness and strength of the materials handling system.

A trolley and platform 110 is shown towards the upper end 30 of the materials handling system 10 with a bucket on it.

Figure 2:
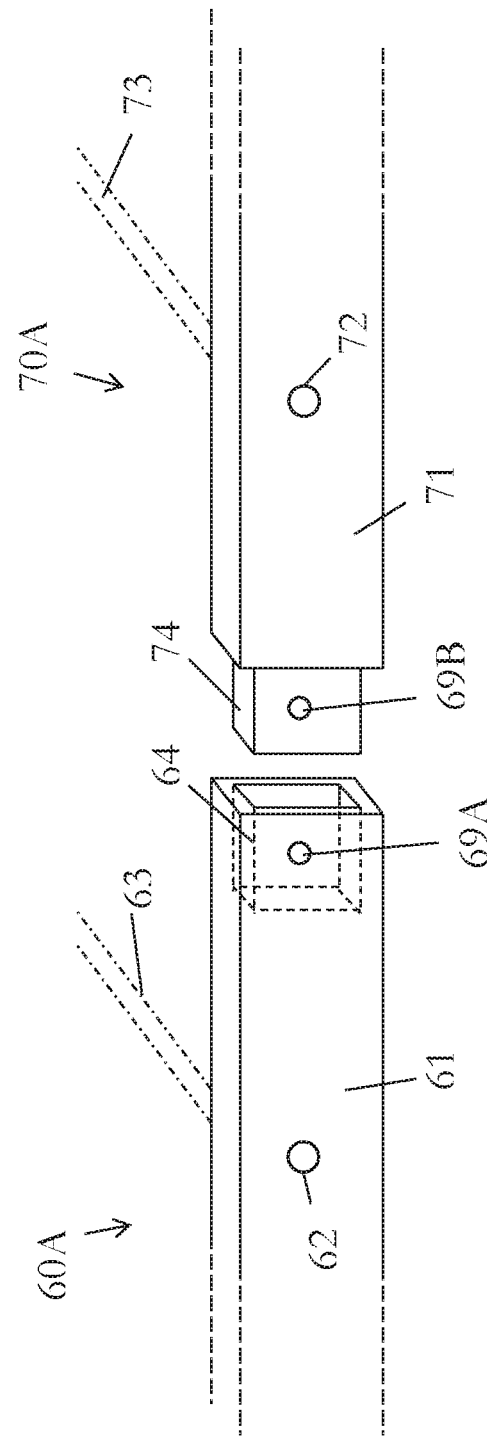
FIG. 2 is a perspective view of part of a connection between two ladder sections.

FIG. 2 shows a close-up view of the stiles 61, 71 of two adjacent ladder sections 60A, 70A disconnected. One ladder section 60A includes a female socket 64 within the end of the stile and the other ladder 70A includes a male projection 74 at the end of the stile. To connect the two ladder sections 60A, 70A the male projection is inserted into the female projection. Means to prevent the two from coming apart may be included such as pins, screws, bolts, clamps, sprung tabs, spring or hook fasteners and the like. The two ladder sections may also be restrained by a ratchet strap or similar adjustable tensioner fed through ladder rungs on either side of the joint. Also shown are portions of rungs 63, 73 and rung holes 62, 72 within the stiles. Holes 69A, 69B allow for a pin or sprung tab to be passed through the stiles and male projection 74 to lock the two ladder sections together.

Figure 3:
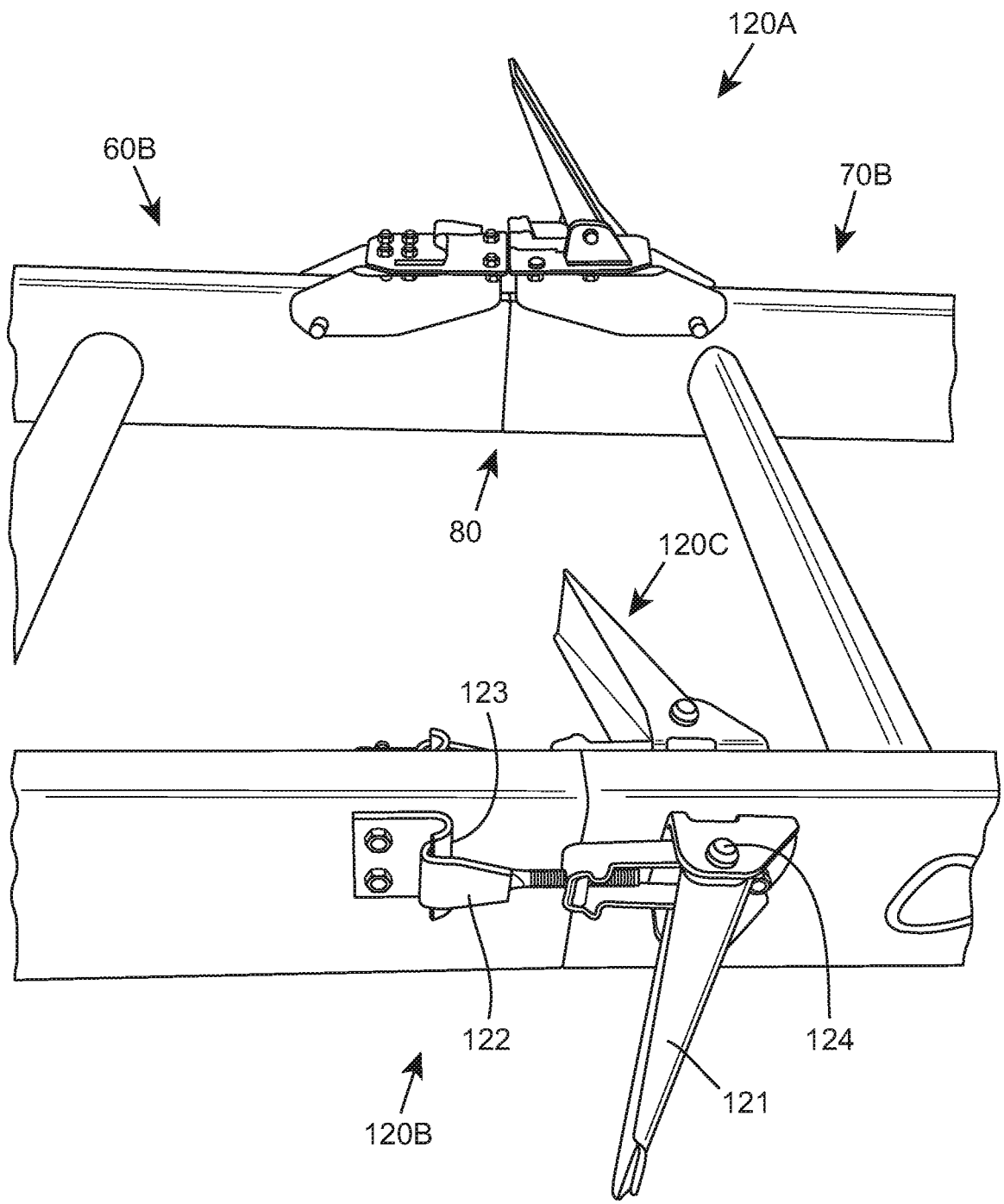
FIG. 3 is a perspective view of clamp connectors used with ladder sections.

In FIG. 3, the two ladder sections 60B, 70B are shown pushed together. They may include male projections and female sockets at the ends of the two ladder sections adjacent one another as described above with reference to FIG. 2.

The side surfaces of each respective pair of stiles are shown contiguous with one another such that they both lie in the same plane. This is also true for each pair of rear and front surfaces.

A clamp 120A is shown in a disconnected state but able to clamp the two rear stiles together.

The front stiles have two clamps 120B, 120C shown. With regard to clamp 120B it comprises a hook 122 at the end of an arm which may be moved by means of a handle 121. The movement is eccentric, using a cam, such that by rotating the arm around the pivot point 124 the hook 122 may be pulled closer to the pivot point 124. This part of the clamp is attached to one of the stiles. A receiving hook 123 is attached to the other stile. In use, with the handle 121 in a first position the two hooks 122, 123 are engaged with one another. The handle is then moved to a second position thus tensioning the connection between the two hooks and the two ladder sections accordingly.

FIG. 4 shows another way of attaching a mast to the ladder sections 60C, 70C. In this version a middle section 81 is arranged between the ends of the two ladder sections 60C, 70C. The middle section comprises two stiles and three rungs 82. The stiles connect to the stiles of the two ladder sections 60C, 70C at the points referenced "80A" and "80B" such that all the stiles along one side of the long ladder are all contiguous and also along the other side.

A mast 190 is comprised of three telescopic sections 191, 192, 193. The lowest section 191 is attached to the mid-point of the central rung 82 of the middle section 81. Cables 100 are attached to, or may pass over, the top of the third section 193 as they extend to and from each ladder section 60C, 70C to tension the system.

The mast 190 also includes four braces 194 each attached at one end to a junction of a rung 82 and the top of the lowest section 191.

In FIG. 4A, an alternative brace 194A is shown. This is a removably attachable brace. The brace 194A comprises an elongate leg which may be offered up to the ladder stile 81A in an approximately vertical manner (shown in broken lines) and inserted into the space between the stiles. It may then be tilted such that its lowermost end 197A tucks underneath a rung 82A. A stud 196A is arranged on the inside surface of the stile, facing the other stile, such that it prevents the leg from tilting too far away from the vertical. The leg also includes a projection 198A which rests beneath the stud 196A to prevent the leg from being pulled upwardly away from the ladder. FIG. 4A shows the eventual position in solid lines.

In use, a pair of braces 194A are attached closely together at their upper end and further apart at their lower ends. The distance between their lower ends is approximately equal to the spacing of the two stiles. A further stud 196A is arranged in a similar position on the inside surface of the opposite stile. A cross-member 195A links to the two braces 194A together. In plan, the two braces 194A and cross-member 195A resemble a Roman alphabet capital "A".

Another pair of braces 194A is arranged but tilting towards the first pair such that together the two pairs resemble the layout shown in FIG. 4, in a pyramidal shape.

The mast 190 may pass through a collar formed at the top where the two pairs meet. The two pairs of braces may be connected together at the top thus preventing them from falling away from the ladder even when they are underneath it. This is because to remove a pair of braces from the ladder the top of one pair of braces must be moved away from the top of the other pair of braces.

Although the lowermost end of the brace 194A is shown as rectilinear it is contemplated that it may curve such that it extends further underneath the rung 82A.

Rung 82A is drawn as square but may equally be circular, D-shaped or any profile generally used in normal ladder construction.

Another type of mast 290 is shown in FIG. 5 which comprises four legs 291 each attached to the ladder sections 60D, 70D at one end and all attached together at the other end 292 distal from the ladder. This allows for a cable 100 to pass over or be attached to the top of the legs 291 to allow tensioning of the system.

Figure 6:
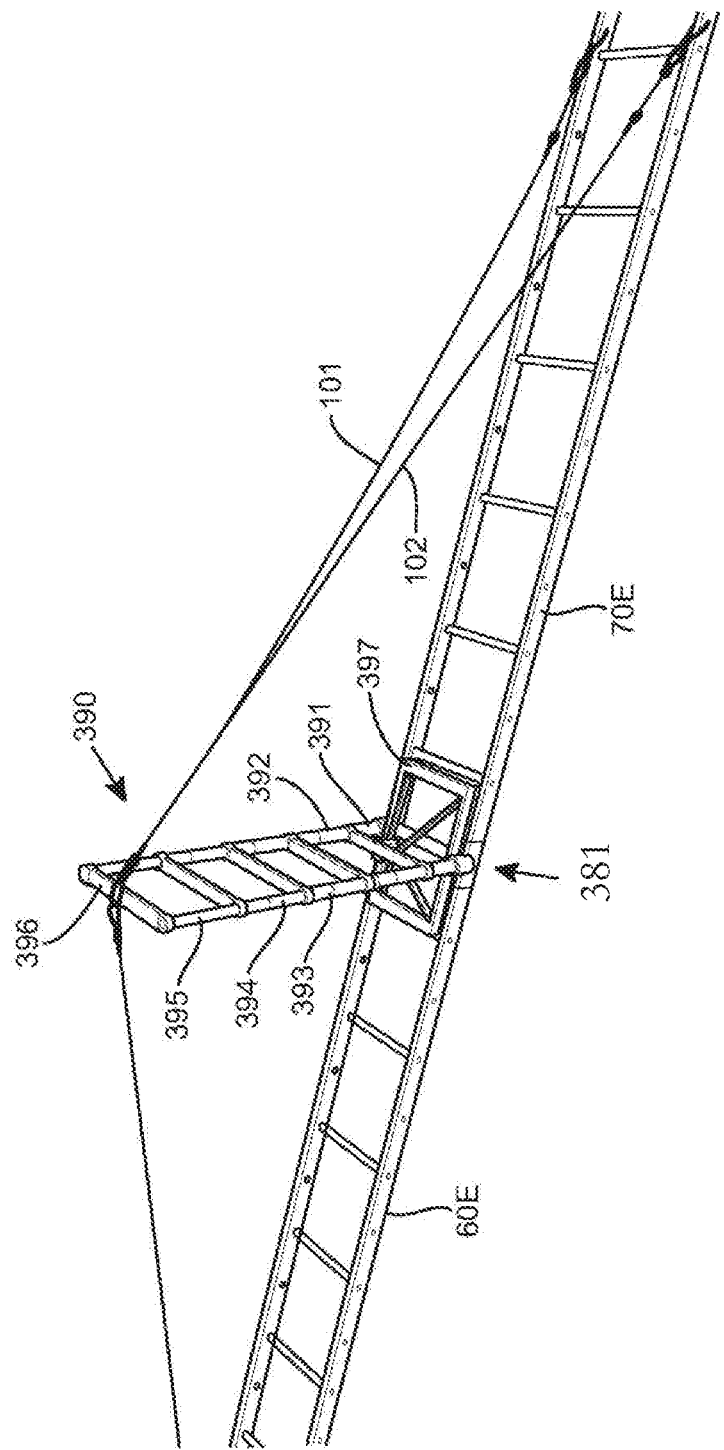
FIG. 6 is a perspective view of a materials handling system including a telescopic ladder as a mast.

In FIG. 6, yet another type of mast 390 is shown. This is a telescopic ladder comprising five sections 391, 392, 393, 394, 395 and a cross member 396 at the end distal from the ladder section 60E, 70E. The lowest section 391 (which has the greatest diameter) is attached to the ladders at the mid-point thereof by means of a rectangular frame 397 which fits between the stiles and is attached thereto, such as by bolts, sprung fasteners, and the like. Cables 101, 102 are attached to the ladder sections and pass over the centre of the cross member 396 at the top of the mast 390.

This longer ladder is formed of two ladder sections 60E, 70E and a middle section 381 arranged between the ends of the two ladder sections. The middle section comprises two stiles and one rung arranged therebetween. The stiles connect to the stiles of the two ladder sections 60E, 70E in a similar manner to those shown in FIG. 4 such that the stiles along each side of the long ladder are contiguous with one another.

Although not shown the cables 101, 102 may each cross-over the cross-member 396 at each outside end thereof, rather than at the centre thereof. Also, each cable may cross over from one side to the other. In other words one cable may be attached to one stile and then cross over the cross member at the end in line with the opposite stile before then being attached to the same initial stile on the other side of the mast. The other cable may do likewise but starting and ending on the other stile. In this way, the two cables 101, 102 may cross-over each other mid-way between the ends attached to the stiles and the cross-member 396. This may provide greater torsional stiffness in the system.

Figure 7:
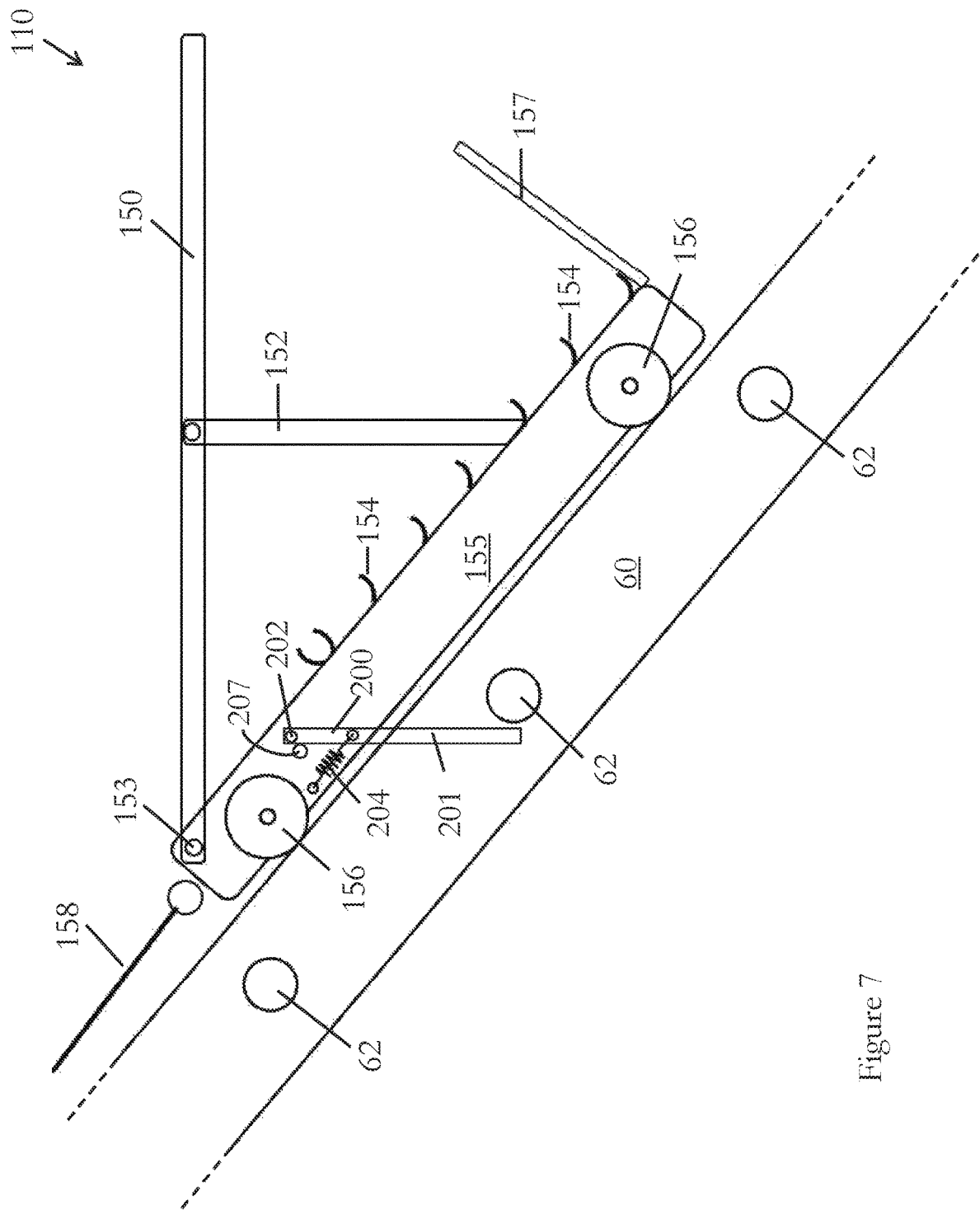
FIG. 7 is a side view sketch of a trolley on part of a ladder section.

Turning now to the trolley 110, a schematic diagram is shown in FIG. 7 comprising a rectangular frame 155 and four wheels 156, one at each corner. The wheels may be configured to stay on the stiles 60 during movement. For instance, the wheels may include flanges to prevent them from moving sideways relative to the length of the ladder.

Other means are contemplated such as a further set of wheels having their rotational axes perpendicular to the axes of the wheels 156 and located within the stiles.

The frame 155 is attached to a cable 158 which may be used to pull the trolley up the ladder. The trolley 110 includes a load carrying platform 150 pivoted at one end 153 to an upper end of the frame 155 and supported by a leg 152 which is pivotably connected to an approximate mid-point of the platform 150 at one end and positionable in one of a series of stops 154 provided in a row running along the frame 155. There may be two legs 152, one either side of the platform 150 and each positionable in stops 154 provided on each side of the frame.

In this way the platform 150 may be maintained approximately horizontal regardless as to the angle the materials handling system is lying at (i.e. the longitudinal length of the ladders) relative to the horizontal.

The trolley 110 also includes a removable foot wall 157. This may be useful when the platform 150 has been pivoted such that it is substantially parallel with the frame 155, to hold items in place on the trolley. For example, bagged materials or personnel may rest against the foot wall 157.

A brake 200 is included comprising an arm 201 pivotably connected to the frame 155 at one end 202 and biased by a spring 204 into a position whereby the other end projects between adjacent rungs 62. In use, as the trolley is pulled up the ladder the lower end of the arm 201 will pivot up and pass over each rung 62 but the biasing means 204 will pull it back to the position shown in FIG. 7. If the cable breaks or for some other reason the trolley 110 starts to descend the ladder without user control the arm 201 will stop it from progressing too far because the lower end will not be able to pass over the first rung 62 it encounters. This is because a stop 207 is provided which prevents the arm 201 from pivoting past a certain point about pivot point 202.

To controllably allow the trolley 110 to descend the ladders a means of overcoming the stop 207 is provided. For instance, the stop may be withdrawn out of the way of the arm. Other means for overcoming the brake are contemplated such as having a cord attached to the lower end of the arm 201, the cord pulling the arm to pivot it out of the way and hold it there.

Figure 7A:
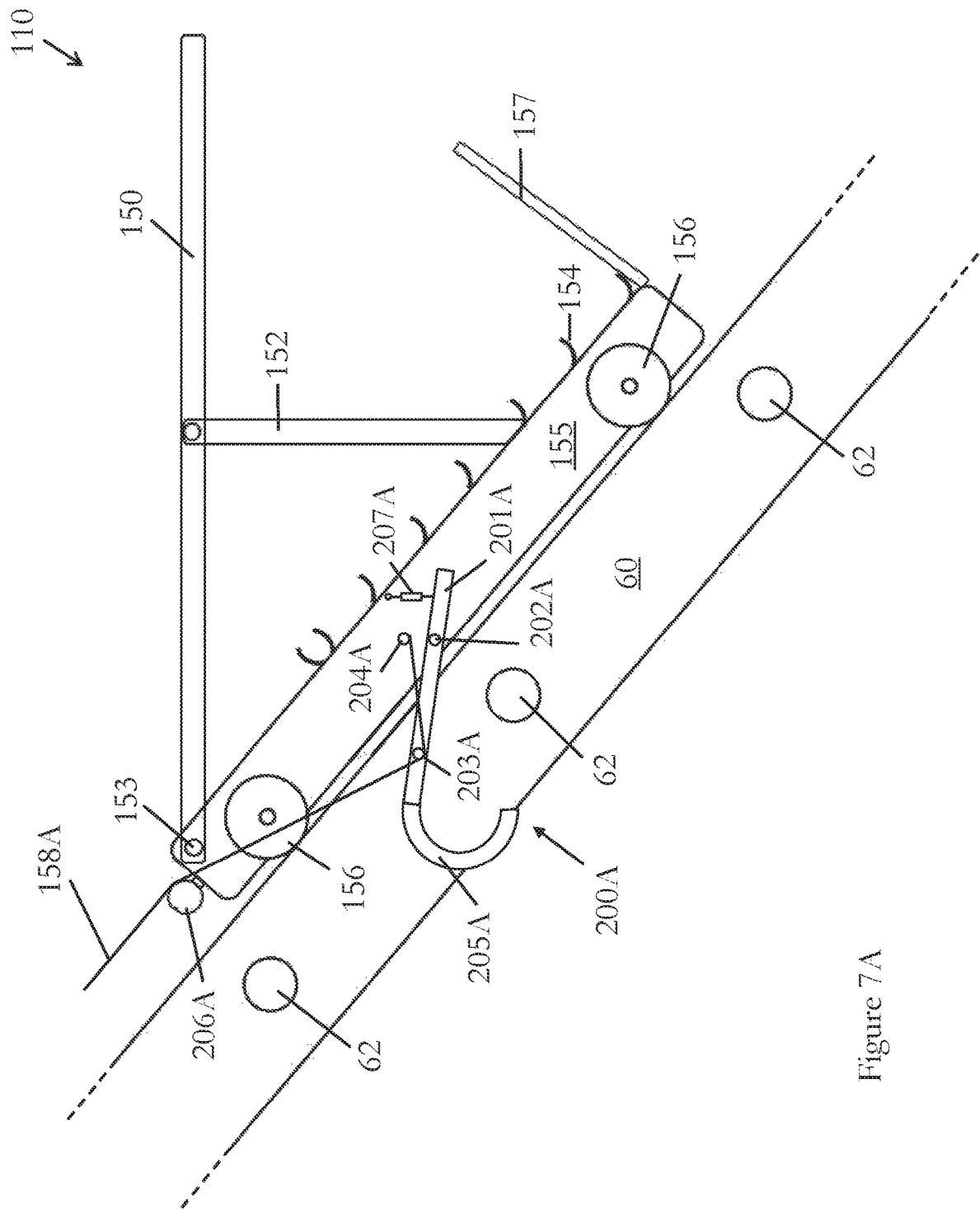
FIG. 7A is as side view sketch of an alternative trolley on part of a ladder section.

An alternative brake 200A is shown in FIG. 7A. An arm 201A is pivotably connected 202A to the frame 155 of the trolley towards one end. At the opposite end of the arm a hook 205A is provided which has a shape and size suitable for catching on a rung 62 of the ladder if in the position as shown in FIG. 7A. The cable 158A, with which the trolley is pulled up the slope, slidably passes over a portion 206A at the upper (front) end of the trolley and then passes underneath a projection 203A arranged on the arm 201A between the hook 205A and the pivot point 202A. The cable 158A then passes to a fixing point 204A arranged on the trolley adjacent the pivot point 202A.

In use, when the cable 158A is under tension the arm 201A will be rotate clockwise about the pivot point 202A due to the cable 158A becoming taut and shorter in length between points 206A and 204A.

This will lift the hook 205A out of the way of the rungs such that the trolley may progress along the ladder. If the cable breaks, or for some other reason its tension is released, the weight of the hook portion 205A will rotate the arm 201A in an anti-clockwise manner around the pivot point 202A such that the hook will catch on the next adjacent rung 62 which it meets, thus halting the trolley from travelling further.

A spring 207A is arranged between the arm 201A, on the opposite side of the pivot 202A from the hook end, and the frame of the trolley. This spring biases the arm with the hook towards the rungs such that when the tension is released from the cable the hook moves into apposition where it will contact a rung.

Figure 8:
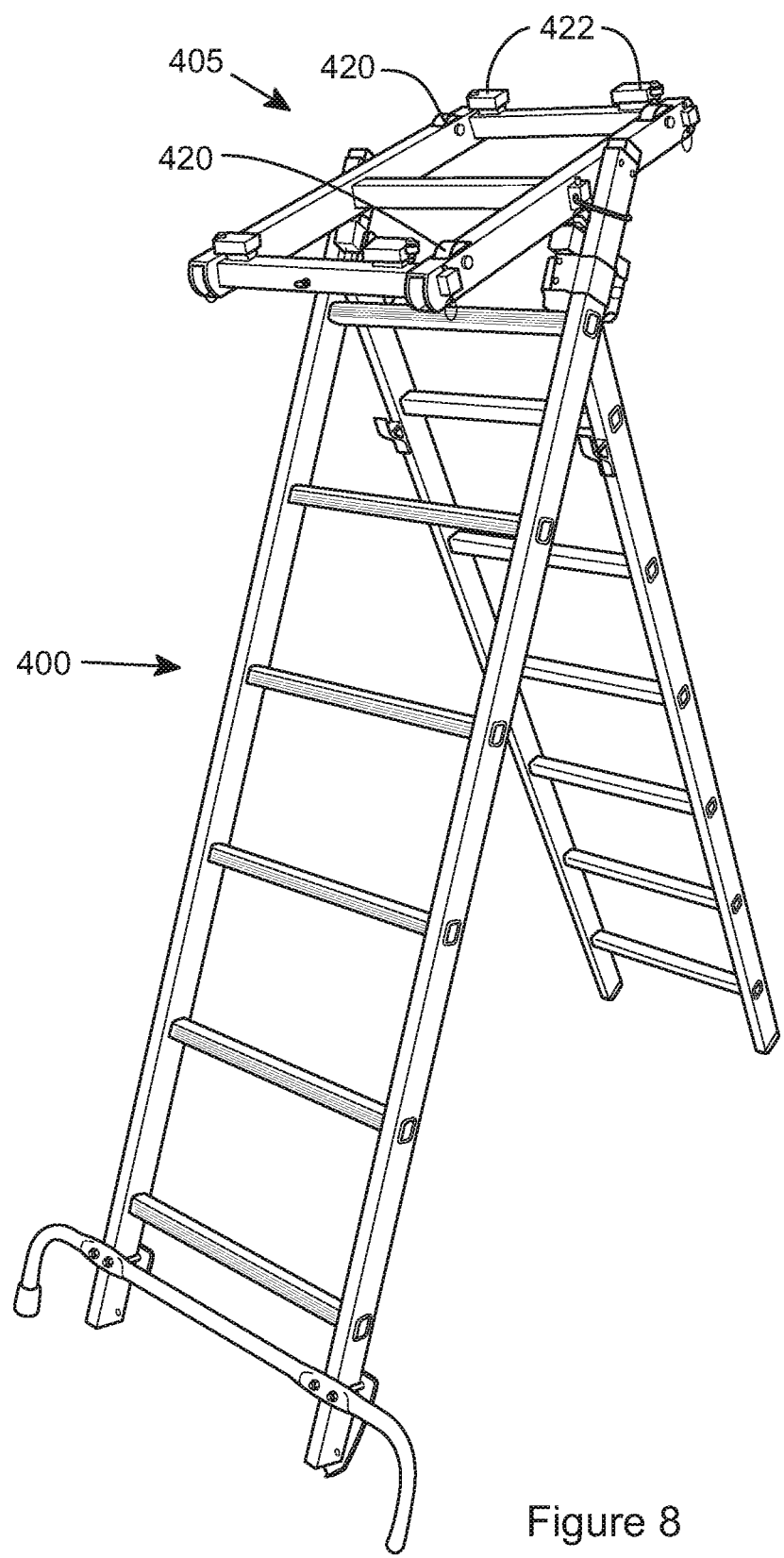
FIG. 8 is a launcher for a materials handling system.
Figure 9:
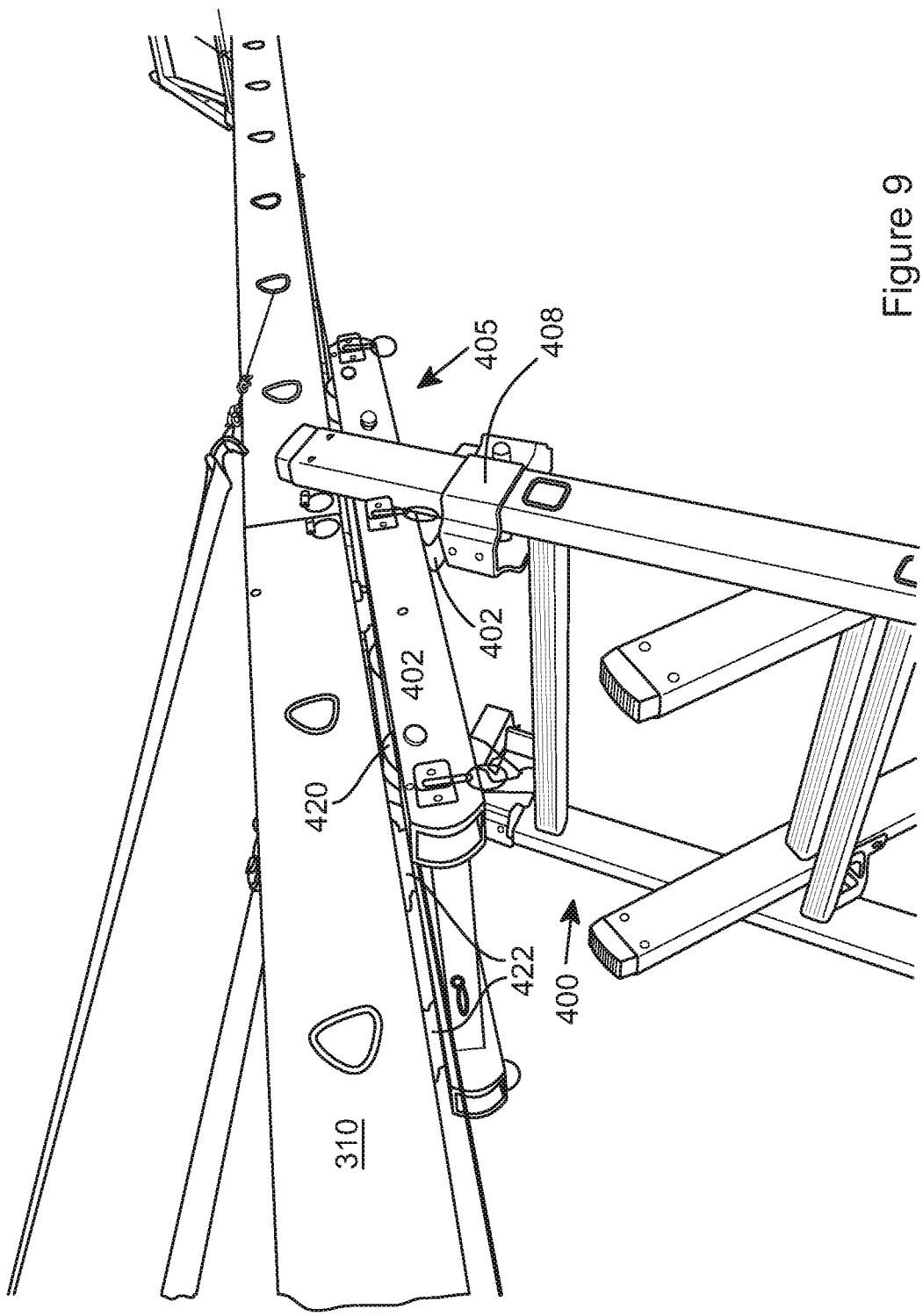
FIG. 9 is a perspective view of part of a stand and longer ladder on a support.

The connected ladder sections may be quite long in overall length and therefore awkward to raise up easily against a building. To ease this, a launch device is provided as shown in FIGS. 8 and 9.

This device comprises a rectangular frame 405 including four wheels 420, one each located towards each corner of the frame. The wheels are arranged such that their axes of rotation are parallel to the plane in which the frame sides all lie.

The frame 405 is releasably attachable towards the top of a 3-way ladder, stepladder, tripod or similar support 400. The frame is pivotable relative to the support 400. The frame may comprise an axle pin projecting outwardly from two opposing sides. The axle pins may be arranged to rest in arcuate shape members provided on the support 400. For instance, these may be fitted into the upper ends of the stiles of the 3-way ladder (not shown). Other ways of attaching the frame 405 to the support 400 are contemplated such as the provision of a rocker block 402 on each side of the support 400 on which the frame may pivot, or rock up and down. The rocker blocks 402 may be screwed, bolted, strapped or clamped 408 etc. to the support 400. The rocker blocks may have a rounded or peaked upper surface on which the ladder may rock.

The frame 405 also comprises four guides 422 each one located near each wheel 420. These guides rest against the inside surface of the two stiles when a ladder section is placed on the frame 405 but have a profile low enough not to snag on the rungs. As the ladder is pushed over the frame 405 the guides 422 prevent it from drifting sideways and falling off the frame.

In use, a long ladder 310, possibly comprising two or more sections, may have one end lifted up and laid on top of the frame. The ladder may then be pushed over the frame. If one end of the ladder is pushed down by an operator then the other end will pivot upwardly. In this way the ladder can be raised such that one end may be positioned against or on a structure. The frame allows this to be achieved by a single person if necessary.

Once in place against or on a structure, the ladder may be rotated, about its longitudinal axis, to an inverted position with the tensioning system, (e.g. the clamps and/or masts and tensioning cables) lowermost such that the ladder is stiffened against gravitational loads for the passage of the goods trolley.

Alternatively, the frame 405 may be held by means of handles (not shown) by one or more people. The frame may be held between people or above their heads to replace the stand.

In one possibility the launch device is the trolley.

Figure 10:
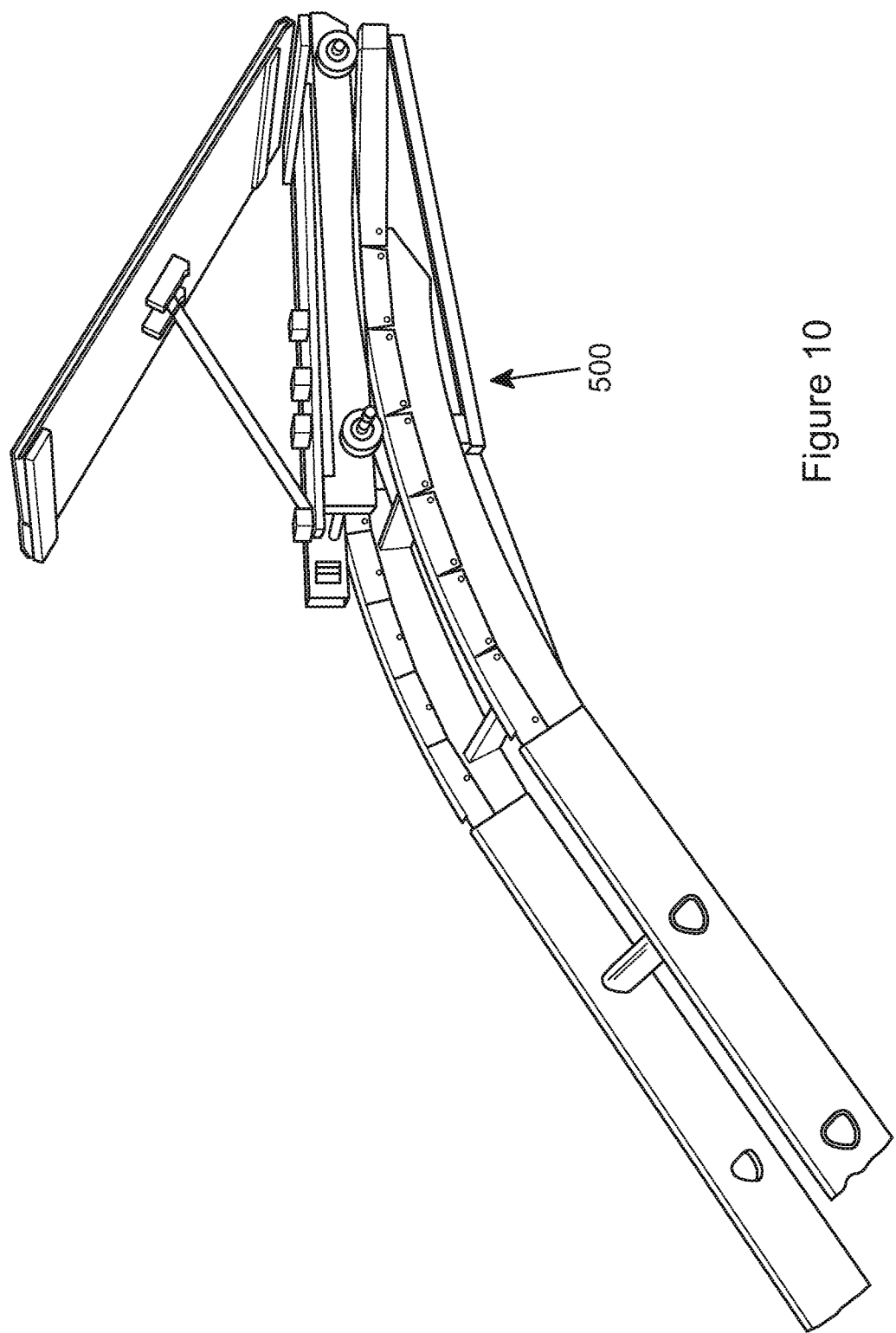
FIG. 10 is a perspective view of an upper end of a longer ladder including a curved section for altering the orientation of the trolley.

FIG. 10 shows how the upper end of the materials handling system may include a curved section 500 to allow the trolley to self-tip. For a trolley to travel along a curved section like this it may be necessary to have the frame 155 raised above the wheels 156, and/or the wheels arranged on stub axles outside the plan footprint of the trolley frame footprint, and/or to have the rungs in this curved section lowered so as to avoid the frame fouling on them. Although shown as curved, other shapes of section 500 are contemplated to permit a direction change in the trolley's progress along the ladder.

In this description the term "ladder" may refer to an ordinary, commonly available ladder having two stiles and a number of rungs. However, it may include apparatus similar to ladders but comprising an intermediate stile.

The invention claimed is:

1. A materials handling system comprising a first and second ladder section including rungs connectable together to form a longer ladder, a tensioning system attached to each section for tensioning the connected ladder sections, and a trolley arranged to travel along the connected ladder sections, wherein the materials handling system includes a cable for moving the trolley along the connected ladder sections, and wherein the trolley comprises an automatic brake for preventing the trolley from travelling in one direction relative to the longer ladder's linear length, wherein the trolley includes a frame and the automatic brake comprises an arm pivotably connected to the frame towards one end of the frame at a pivot point, the arm including a hook for catching on a rung of the ladder, and a projection arranged on the arm between the hook and the pivot point, wherein, in use, the cable slidably passes over a portion of the trolley and then passes underneath the projection, the cable fixed to the frame adjacent the pivot point, such that in use, when the cable is under tension, the arm is rotated clockwise about the pivot point due to the cable becoming taut and lifting the hook out of the way of the rungs such that the trolley's progress is unimpeded along the ladder, but such that, if the cable breaks or its tension is released, the weight of the hook rotates the arm in an anti-clockwise manner around the pivot point such that the hook catches on the next adjacent rung which it meets, thus halting the trolley from travelling further.

2. The materials handling system of claim 1, wherein at least one surface on one stile of each first and second ladder section are contiguous with one another.

3. The materials handling system of claim 1, wherein the ladder sections are connectable together by means of a male projection arranged at the end of one of the two sections and a corresponding female socket arranged at the end of the other of the two sections.

4. The materials handling system of claim 1, wherein the tensioning system comprises a clamp arranged across the junction of the two ladder sections.

5. The materials handling system of claim 1, wherein the tensioning system comprises a mast extending away from the longer ladder and a cable attachable to the mast and/or either or both ladder sections, wherein the mast is arranged to hold the cable away from the longer ladder.

6. The materials handling system of claim 5, wherein the mast comprises two pairs of braces, each pair arranged to be releasably attached to the longer ladder, and arranged to be releasably affixed to one another at their ends distal from the ladder.

7. The materials handling system of claim 6, further comprising an intermediate ladder section releasably connectable between the first and second ladder sections.

8. The materials handling system of claim 5, wherein the length of the mast is adjustable.

9. The materials handling system of claim 5, wherein the cable is attached to both ladder sections centrally between the stiles.

10. The materials handling system of claim 1, further comprising a cross member at, or adjacent, at least one end of the longer ladder.

11. The materials handling system of claim 1, wherein the trolley comprises a deck for carrying materials, wherein the position of the deck relative to the linear length of the longer ladder is adjustable to maintain it horizontal when the longer ladder is other than perpendicular or horizontal.

12. The materials handling system of claim 1, further comprising a third ladder section having a longitudinal axis non-parallel to the longitudinal axis of the first and second ladder sections.

13. The materials handling system of claim 12, wherein the third ladder section is integral with one of the first and second ladder sections.

14. The materials handling system of claim 1, further comprising a launch device comprising a support for supporting the longer ladder, the support including a surface to allow the longer ladder to move relative to it.

15. The materials handling system of claim 14, wherein the longer ladder is slidable over the surface.

16. The materials handling system of claim 15, wherein the launch device includes rollers over which the longer ladder is movable.

17. The materials handling system of claim 15, further comprising a stand for raising the support above the ground.

18. The materials handling system of claim 15, wherein the support is pivotable relative to the stand.

19. The materials handling system of claim 1, further comprising a spring arranged between the arm and the frame of the trolley, the spring biasing the arm with the hook towards the rungs such that when tension is released from the cable the hook is moved into a position where it contacts and catches a rung.

* * * * *